United States Patent [19]

Harr et al.

[11] E Patent Number: Re. 32,023

[45] Reissued Date of Patent: Nov. 5, 1985

[54] FLOTATION VEST

[75] Inventors: Robert G. Harr, Whittier; Gaylord T. Soli, San Marino, both of Calif.

[73] Assignee: America's Cup, Inc., City of Industry, Calif.

[21] Appl. No.: 577,524

[22] Filed: Feb. 6, 1984

Related U.S. Patent Documents

Reissue of:

[64] Patent No.: 4,380,441
Issued: Apr. 19, 1983
Appl. No.: 239,460
Filed: Mar. 2, 1981

[51] Int. Cl.[4] ..... B63C 9/08

[52] U.S. Cl. ..... 441/112; 441/117; 441/125; 441/127

[58] Field of Search ..... 441/80, 88, 102–128

[56] References Cited

U.S. PATENT DOCUMENTS

| | | | |
|---|---|---|---|
| 703,363 | 7/1902 | Ayvad | 441/88 |
| 1,058,402 | 4/1913 | Ayvad | 441/188 |
| 1,295,667 | 2/1919 | Ziman | 441/116 |
| 1,670,887 | 5/1928 | Gibson | 441/116 |
| 3,090,054 | 5/1963 | Moran | 441/127 |
| 3,371,363 | 3/1968 | LeBlanc, Jr. | 441/118 |
| 3,383,722 | 5/1968 | LeBlanc, Jr. | 441/118 |
| 3,400,415 | 9/1968 | Scheurer | 441/112 |
| 3,449,778 | 6/1969 | Jones | 441/112 |
| 3,545,017 | 12/1970 | Cohn | 441/112 |
| 3,727,249 | 4/1973 | Bonthelius | 441/127 |
| 4,180,883 | 1/1980 | Oldham | 441/127 |

OTHER PUBLICATIONS

Stearns Brochure of Life Vests and Jackets, Jul., 1979.
Wellington Brochure relating to life vests, 1975 (cover only).

*Primary Examiner*—Galen L. Barefoot
*Assistant Examiner*—C. T. Bartz
*Attorney, Agent, or Firm*—Knobbe, Martens, Olson & Bear

[57] ABSTRACT

Foam buoyancy [section] *sections* carried in the front of a flotation vest are formed in four separate pieces that are cut from rectangular sheets of buoyancy material without any waste material.

23 Claims, 6 Drawing Figures

Fig. 1
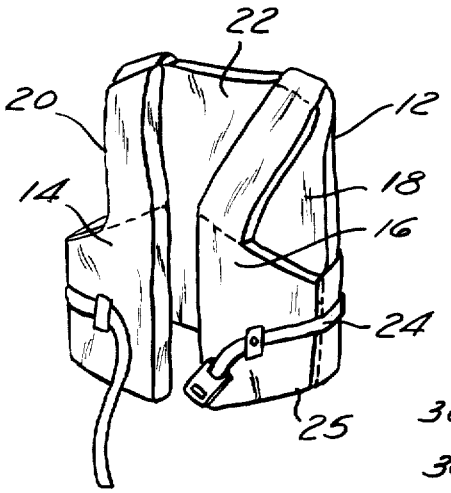
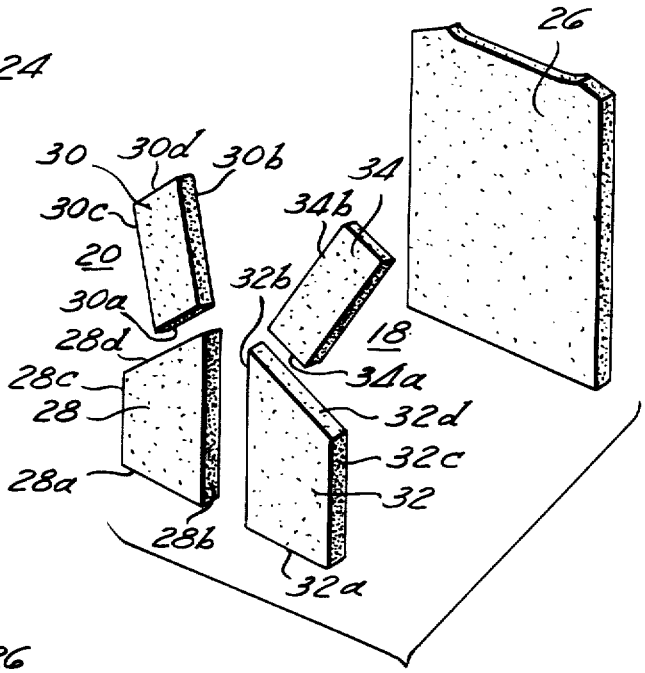
Fig. 2
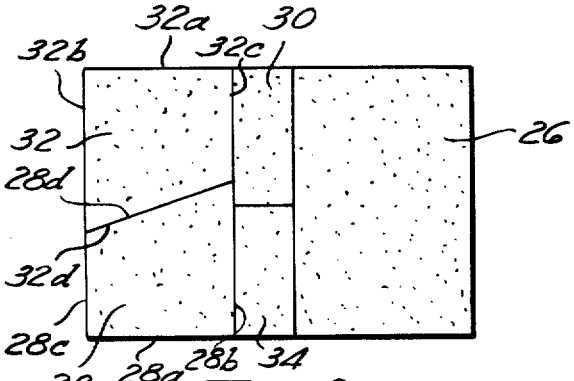
Fig. 3
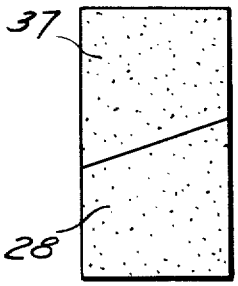
Fig. 4
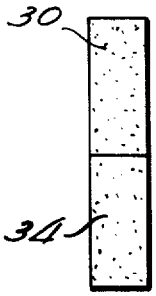
Fig. 5
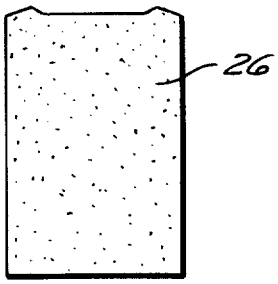
Fig. 6

FLOTATION VEST

Matter enclosed in heavy brackets [ ] appears in the original patent but forms no part of this reissue specification; matter printed in italics indicates the additions made by reissue.

FIELD OF THE INVENTION

This invention relates to an improved flotation vest and more particularly to an improved arrangement for use of the buoyancy material carried by the vest.

BACKGROUND OF THE INVENTION

In a typical way of making a flotation vest, an outer shell or envelope of nylon or other suitable material is formed in the shape of a vest, and closed-cell polyvinylchloride foam or other buoyancy material is inserted into the shell before the shell is completely closed. The flotation material usually includes a back piece and left and right front sections with the upper portion of each front section having curved edges to form arm hole openings in combination with the back and to form a neck hole opening with the back. The cutting of these curved edges from rectangular sheets results in wasted foam material, and requires special dies to cut the curved edges on a mass produced basis.

SUMMARY OF THE INVENTION

The present invention provides an improvement over the foregoing system in that the front pieces are formed in a manner to eliminate waste material and to simplify the cutting operations. More specifically, the left and right front sections of the flotation material are each formed with a lower body piece and an upper shoulder piece. These pieces have straight edges and are essentially rectangular except that the upper edge of the body piece and the lower edge of the shoulder piece which engage are formed so that the shoulder pieces extend upwardly and outwardly away from the central edge of the body piece at an angle. In formation of the pieces, the left and right body pieces form a rectangular section when their upper edges are in edge-to-edge contact. Similarly, when the shoulder pieces are placed in edge-to-edge engagement, a rectangular section is formed. Thus, the pieces are formed with no loss of buoyancy material.

In a preferred form of the invention, the central edge of the body piece is longer than the outer side edge of the body piece so that the upper edge of the piece extends at an angle with respect to the lower edge. The shoulder pieces are simply formed as rectangles. With that arrangement, when the lower edge of the shoulder piece engages the angled upper edge of the body piece, the shoulder piece is tilted or angled outwardly towards the shoulder so that a portion of the upper edge of the body piece and the outer edge of the shoulder piece and an upper portion of the back piece form an arm hole. Correspondingly, the neck opening edge of the shoulder piece is sloped properly to define the neck opening in combination with the other shoulder piece and with the back piece.

For adult sizes of flotation vests, the average or central height of the body piece may be made equal to the height or length of the shoulder piece such that when the two body pieces are placed edge-to-edge with their upper edges in engagement, and the two shoulder pieces are placed with their lower edges engaging, the overall height of the body pieces is equal to the overall height of the shoulder pieces. Consequently, those four pieces can be cut from a single rectangular sheet if desired. A one-piece back portion is equal to the combined height of the front body pieces such that it too can be formed from the same rectangular section of material if front and back pieces are to have the same thickness. Thus, the buoyancy material may be simply formed as five separate pieces, which when properly arranged can be cut from a single rectangular sheet without any wasted material.

SUMMARY OF THE DRAWINGS

FIG. 1 is a perspective view of a completed life vest utilizing the teachings of the invention;

FIG. 2 is an exploded perspective view of the five pieces of buoyancy material needed for the vest of FIG. 1;

FIG. 3 shows the five pieces of buoyancy material fitted together to form a single rectangular sheet from which they can be cut;

FIG. 4 shows two front body pieces positioned with their upper edges in engagement to illustrate that these body pieces may be formed from a sheet of material separate from the shoulder and back buoyancy pieces;

FIG. 5 shows two of the shoulder pieces positioned in edge to edge relation; and FIG. 6 shows a back buoyancy piece by itself.

DETAILED DESCRIPTION OF A PREFERRED EMBODIMENT OF THE INVENTION

The flotation vest or life jacket illustrated in FIG. 1 includes a back section 12, a right front section 14, and a left front section 16. The front sections 14 and 16 are secured to the back section at their upper edges and at their lower side edges to form left and right armholes 18 and 20, while the inner upper edges of the front sections and the upper edge of the back section form the neck opening 22. A belt 24 attached to the front and back sections enables the front central edges of the front section to be held together after the wearer has donned the vest. A zipper is usually also provided.

The main portion of the vest visible in FIG. 1 is really an outer shell 25 or envelope formed of nylon or other suitable material which carries buoyancy material to help the user float. Typically, buoyancy material is inserted into the shell through its lower edge before the shell is completely sewn closed. A variety of buoyancy materials may be utilized, but usually a closed cell synthetic foam material made of polyvinylchloride or polyethylene is employed.

In accordance with the present invention, the buoyancy material is formed of five separate pieces as illustrated in FIG. 2. This includes a back piece 26, a right front low body piece 28, a right front shoulder piece 30, a left front body piece 32, and a left front shoulder piece 34. As can be seen, the front body pieces mate together to conform to the front configuration of the vest as illustrated in FIG. 1. Broken lines are shown in FIG. 1 where the front buoyancy pieces engage within the envelope 25.

When the various foam pieces are cut, they fit together as shown in FIG. 3, creating a single rectangular sheet such that in cutting them there is no waste material. If desired, the upper edges of the back pieces 26 may be trimmed slightly as illustrated in FIG. 2, to better create the desired shape.

Of course, it is not necessary that the five pieces be formed from a single sheet as illustrated in FIG. 3, but instead the body pieces 28 and 32 may be formed separately from a sheet of material, as illustrated in FIG. 4. Similarly, the shoulder pieces 34 may be formed as separate pieces from a separate sheet, as shown in FIG. 5; and the back piece 26 shown in FIG. 6 may be formed from a separate sheet of material.

Considering the front buoyancy pieces in more detail, it may be seen from FIG. 2 that the front body piece 28 includes a lower edge 28a, a central edge 28b, a side edge 28c, and an upper edge 28d. The central edge 28b and the side edge 28c are parallel to each other and they are perpendicular to the lower edge 28a. The central edge 28b is longer than the side edge 28c such that the upper straight edge 28d extends at an angle with respect to the edge 28a. That is, if the upper and lower edges were extended to intersect they would form an angle. Preferably, that angle is in the area of 20°. Correspondingly the angle formed by the upper edge 28d and the central edge 28b is about 70°. The body piece 32 is identical to piece 28 except that it is reversed so that the longer central edge 32b is adjacent to the central edge 28b of the piece 28.

The shoulder piece 30 is rectangular and includes a lower edge 30a which engages the upper edge 28d of the body piece 28, a neck opening edge 30b, an arm opening edge 30c, and an upper edge 30d. The shoulder piece 34 is identical to the piece 30.

Thus, it can be seen that when the lower edges 30a and 34a of the shoulder pieces are placed respectively into engagement with the upper edges 28d and 32d of the body pieces 28 and 32, with the neck opening shoulder piece edges 30b and 34b intersecting the central edges 28b and 32b of the body pieces, the slope of the upper walls 28d and 32d of the body pieces cause the shoulder pieces 30 and 34 to extend outwardly away from the central edges of the body pieces towards the wearer's shoulders. The angle formed by the shoulder piece edge 30b and the body piece central edge 28b is preferably about 160°.

Note that the body pieces could be made completely rectangular and the shoulder pieces formed with their lower edges at an angle that would produce the desired slope. Such an arrangement would still have the advantage of straight line cuts which form rectangular sections so as to involve no waste material. However, this arrangement is less advantageous in that there would be less buoyancy material immediately under the arm openings of the vest. Of course, the desired angle could be split between the shoulder pieces and the body pieces in whatever combination desired so that neither the body pieces nor the shoulder pieces would be completely rectangular. Nevertheless, they would mate together to form rectangular sections.

For adults, a single set of flotation pieces may be employed in that the buoyancy requirement does not vary greatly. The girth of the vest may be varied by varying the amount of material between the buoyancy pieces. In a production version of the vest, the front body pieces 28 and 32 when placed together, as shown in FIG. 4, form a rectangle approximately $19 \times 9\frac{1}{2}$ inches, with the central edge 28b being about 11 inches and the shorter side 28c being about 8 inches. The shoulder pieces are about $9\frac{1}{2} \times 4$ inches. Note that the length of a shoulder piece is equal to the width of a body piece, which may be convenient in cutting operations. Note also, that two of the shoulder pieces when placed side by side form a rectangle $9\frac{1}{2} \times 8$ inches which is equal to the rectangular lower portion of the body piece 28, that is, not including the triangular upper portion. A body piece 28 could of course be formed in several sections if desired.

It has been found that the convenient arrangement illustrated in FIG. 3, wherein the combined length or height of the shoulder pieces 30 and 34 is equal to the combined length or height of the body pieces 28 and 32 is not quite so satisfactory for children's sizes of the vest. With such smaller sizes the shoulder pieces are preferably shortened so that their combined length or height is less than the combined length or height of the body pieces. This does not detract from the efficiency of the operations. As illustrated in FIGS. 4 and 5, the body pieces and shoulder pieces may be totally formed from separate sheets of material having the desired width or height. The slope of the shoulder pieces is preferably sharper for children's sizes.

It may be desirable to have the front buoyancy pieces made from material thicker than the back piece 26. With such an arrangement, all five pieces could of course not be cut from a single section as shown in FIG. 3, but again the convenience or efficiency of the arrangement is not lost in that the back pieces may be separately made from thinner material and still have essentially the rectangular configuration. In some instances it may be desirable to form the foam pieces in thin layers which are stacked to obtain the desired thickness. In a preferred arrangement the front pieces are about $1\frac{1}{4}$ inches thick, and the back piece is $\frac{3}{4}$ inch thick. With $\frac{1}{4}$ inch layers, five layers could be used in front and three in back.

What is claimed is:

1. A flotation vest having an outer shell including a back section and left and right front sections joined to the back section at the top and at the sides to form arm holes, and internal buoyancy means carried by the shell and including front portions formed by at least four pieces of buoyancy material which when properly fitted edgewise together form rectangular pieces such that there is no waste material in cutting the pieces from rectangular sheets, the front buoyancy portions include a lower body piece and a shoulder piece carried by each of the left and right front sections, each of said body pieces having a lower edge, a central edge, a side edge, and an upper edge, each shoulder piece including a lower edge, an arm hole edge, a neck hole edge, and an upper edge, the shoulder piece lower edge being positioned to engage the body piece upper edge with said engaging edges being formed to engage at an angle such that the arm hole edge and the neck hole edge of the shoulder piece slope at any angle upwardly and outwardly away from the body piece central edge, the width of a shoulder piece between the arm hole and neck hole edges being considerably less than the width of a body piece between its side and central edges so that with the shoulder piece lower edge being positioned close to the body piece central edge, a portion of the body piece upper edge forms an arm hole with the arm hole edge of a shoulder piece.

2. The vest of claim 1 wherein said shoulder pieces are rectangular and each body piece central edge is longer than its side edge so that the upper edge of each body piece is not parallel to its lower edge.

3. The vest of claim 1 wherein said body piece central edge is parallel to its side edge and perpendicular to said body piece lower edge.

4. The vest of claim 3 wherein said shoulder piece arm hole edge and neck hole edge are parallel to each other and perpendicular to the shoulder piece upper edge.

5. The vest of claim 3 wherein the body pieces if placed with their upper edges engaging each other form a rectangle.

6. The vest of claim 5 wherein the rectangle formed is about twice as long as it is wide.

7. The vest of claim 5 wherein the combined height of two of the body pieces when positioned with their upper edges engaging is equal to the combined length of two shoulder pieces.

8. The vest of claim 7 including a back buoyancy piece the height of which is equal to the combined height of two body pieces.

9. The vest of claim 3 wherein the upper edge of the body piece forms an angle of approximately 20° with respect to the lower edge of the body piece.

10. The vest of claim 1 wherein the neck hole edge of the shoulder piece intersects the central edge of its adjacent body piece to form an angle of approximately 160°.

11. The vest of claim 1 wherein the neck hole edge of a shoulder piece forms an angle with the central edge of the engaging body piece, and the width of the shoulder piece is less than that of the engaging body piece.

12. The vest of claim 1 wherein the length of a shoulder piece is about equal to the width of a body piece.

13. A flotation vest having an outer shell including a back section and left and right front sections joined to the back sections at the top and at the sides to form arm holes, and internal buoyancy means carried by the shell and including front portions formed by at least four pieces of buoyancy material which when properly fitted edgewise together form rectangular pieces such that there is no waste material in cutting the pieces from rectangular sheets, the front buoyancy portions include a straight edged lower body piece and a straight edged shoulder piece carried by each of the left and right front sections, each of said body pieces having a lower edge, a central edge perpendicular to the lower edge, a side edge parallel to central and shorter than the central edge, and an upper edge extending it an angle of about 20° with respect to the lower edge, each shoulder piece having a rectangular shape including a lower edge, an arm hole edge, a neck hole edge, and an upper edge, the shoulder piece lower edge being positioned to engage the body piece upper edge such that the arm hole edge and the neck hole edge of the shoulder piece slope at an angle upwardly and outwardly away from the body piece central edge, the length of the shoulder piece lower edge being considerably shorter than the width of a body piece, and said outer shell is formed so that the neck hole edge of the shoulder piece intersects the upper end of the body portion central edge.

14. The vest of claim 13 wherein the combined height of two of the body pieces when positioned with their upper edges engaging to form a rectangle is equal to the combined height of two shoulder pieces when positioned with their upper edges engaging to form a rectangle.

15. The vest of claim 14 including a back buoyancy piece the height of which is equal to the combined height of two body pieces so that the five buoyancy pieces when fit together form a rectangle and hence may be cut from a single rectangular sheet without any waste buoyancy material.

16. The vest of claim 14 wherein the height of a shoulder piece is equal to the width of a body piece.

*17. A flotation vest having an outer shell including a back section and left and right front sections joined to the back section at the top and at the sides to form arm holes, and internal buoyancy means carried by the shell and including front portions formed by at least four quadrilateral pieces of buoyancy material which when properly fitted edgewise together form a single, substantially rectangular piece such that waste material is minimized in cutting the pieces from rectangular sheets, the front buoyancy portions include a lower body piece and a shoulder piece carried by each of the left and right front sections, each of said body pieces having a lower edge, a central edge, a side edge, and an upper edge, each shoulder piece including a lower edge, an arm hole edge, a neck hole edge, and an upper edge, the shoulder piece lower edge being positioned to engage the body piece upper edge with said engaging edges being formed to engage at an angle such that the arm hole edge and the neck hole edge of the shoulder piece slope at an angle upwardly and outwardly away from the body piece central edge.*

*18. The vest as recited in claim 17 wherein the width of a shoulder piece between the arm hole and neck hole edges being considerably less than the width of a body piece between its side and central edges so that with the shoulder piece lower edge being positioned close to the body piece central edge, a portion of the body piece upper edge forms an arm hole with the arm hole edge of a shoulder piece.*

*19. A flotation vest having an outer shell including a back section and left and right front sections joined to the back section at the top and at the sides to form arm holes, and internal buoyancy means carried by the shell and including front portions formed by at least four quadrilateral pieces of buoyancy material which when properly fitted edgewise together form a plurality of substantially rectangular pieces such that waste material is minimized in cutting the pieces from a plurality of rectangular sheets, the front buoyancy portions include a lower body piece and a shoulder piece carried by each of the left and right front sections, each of said body pieces having a lower edge, a central edge, a side edge, and an upper edge, each shoulder piece including a lower edge, an armhole edge, a neck hole edge and an upper edge, the shoulder piece lower edge being positioned to engage the body piece upper edge with said engaging edges being formed to engage at an angle such that the arm hole edge, and the neck hole edge of the shoulder piece slope at an angle upwardly and outwardly away from the body piece central edge, wherein the width of a shoulder piece between the arm hole and neck hole edges being considerably less than the width of a body piece between its side and central edges so that a portion of the body piece upper edge forms an arm hole with the arm hole edge of a shoulder piece.*

*20. A flotation vest having an outer shell including a back section and left and right front sections joined to the back section at the top and at the sides to form arm holes, and internal buoyancy means carried by the shell and including front portions formed by at least four quadrilateral pieces of buoyancy material which can be formed from rectangular sheets of buoyancy material such that waste material is minimized in cutting the pieces from rectangular sheets, the front buoyancy portions include a lower body piece and a shoulder piece carried by each of the left and right front sections, each of said body pieces having a lower edge, a central edge, a side edge, and an upper edge, each shoulder piece including a lower edge, an arm hole edge, a neck hole edge, and an upper edge, the shoulder piece lower*

*edge being positioned to engage the body piece upper edge with said engaging edges being formed to engage at an angle such that the arm hole edge and the neck hole edge of the shoulder piece slope at an angle upwardly and outwardly away from the body piece central edge, wherein the width of a shoulder piece between the arm hole and neck hole edges being considerably less than the width of a body piece between its side and central edges so that a portion of the body piece upper edge forms an arm hole with the arm hole edge of a shoulder piece.*

*21. The vest of claim 20 wherein said quadrilateral pieces of buoyancy material are formed from at least two rectangular sheets of buoyancy material.*

*22. A flotation vest having an outer shell including a back section and left and right front sections joined to the back section at the top and at the sides to form arm holes, and internal buoyancy means carried by the shell and including front portions formed by at least four quadilateral pieces of buoyancy material formed such that waste material is minimized in cutting the pieces from a plurality of sheets, the front buoyancy portions include a lower body piece and a shoulder piece carried by each of the left and right front sections, each of said body pieces having a lower edge, a central edge, a side edge, and an upper edge, each shoulder piece including a lower edge, an arm hole edge, a neck hole edge, and an upper edge, the shoulder piece lower edge being positioned to engage the body piece upper edge with said engaging edges being formed to engage at an angle such that the arm hole edge and the neck hole edge of the shoulder piece slope at an angle upwardly and outwardly away from the body piece central edge, wherein the width of a shoulder piece between the arm hole and neck hole edges being considerably less than the width of a body piece between its side and central edges so that a portion of the body piece upper edge forms an arm hole with the arm hole edge of a shoulder piece.*

*23. A flotation vest having an outer shell including a back section and left and right front sections joined to the back section at the top and at the sides to form arm holes, and internal buoyancy means carried by the shell and including front portions formed by at least four pieces of buoyancy material when properly fitted edgewise together, form a plurality of quadrilateral pieces such that waste material is minimized in cutting the pieces from rectangular sheets, the front buoyancy portions include a lower body piece and a shoulder piece carried by each of the left and right front sections, each of said body pieces having a lower edge, a central edge, a side edge, and an upper edge, each shoulder piece including a lower edge, an arm hole edge, a neck hole edge, and an upper edge, the shoulder piece lower edge being positioned to engage the body piece upper edge with said engaging edges being formed to engage at an angle such that the arm hole edge and the neck hole edge of the shoulder piece slope at an angle upwardly and outwardly away from the body piece central edge, wherein the width of a shoulder piece between the arm hole and neck hole edges being considerably less than the width of a body piece between its side and central edges a portion of the body piece upper edge forms an arm hole with the arm hole edge of a shoulder piece.*

* * * * *